United States Patent Office 3,264,325
Patented August 2, 1966

3,264,325
1-AMINO-2-[2-(2-CYANOETHOXY)ETHOXY]-4-HYDROXYANTHRAQUINONE
Charles Edward Lewis, Somerville, N.J., assignor to American Cyanamid Company, Stamford, Conn., a corporation of Maine
No Drawing. Filed May 11, 1965, Ser. No. 454,980
1 Claim. (Cl. 260—380)

This application is a continuation-in-part of my co-pending application, Serial No. 177,955, filed March 7, 1962, and now abandoned.

This invention relates to a cyanoalkoxylated anthraquinone compound; and more particularly to a cyanoalkoxy anthraquinone disperse dye fast to sublimation and suitable for dyeing hydrophobic polymeric materials, such as synthetic fibers.

Anthraquinone disperse dyes for polymeric materials such as polyester and acetate fibers are known in the art. They include hydroxyalkoxylated, alkoxyalkoxylated, chloroalkoxyalkoxylated, alkoxylated, arylalkoxylated and aryloxylated derivatives of anthraquinone. A disperse dyestuff must possess certain properties in order to be commercially feasible. Among the desired qualities are good color value, proper solubility characteristics, stability to light, compatibility with the dyeing medium and the substrate, and sublimation fastness. While most of these requirements can be fulfilled by proper choice of a particular anthraquinone derivative, fastness to sublimation has eluded satisfactory solution. This is a real drawback to the use of anthraquinone disperse dyes, since the indispensible heat setting or ironing operations employed in manufacturing the final product invariably reduces its depth of color by subliming the dyestuff. Increasingly higher temperatures are being used in the mills for heat setting and other heat treatments. It has become a commercial requirement that disperse dyes be stable to sublimation at the high temperatures of 383° F. to 410° F.

In view of the difficulties encountered with known disperse dyes, it is an object of the present invention to provide an anthraquinone compound suitable for disperse dyeing but without the above-mentioned deficiencies. Other objects will be apparent hereinafter.

Accomplishment of the objects of the present invention is made possible by the discovery of a new compound represented by the formula:

(A)
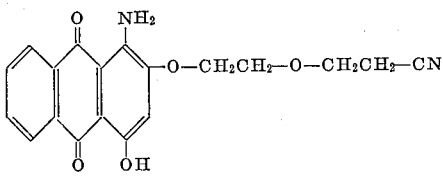

When this compound is dyed on polymeric materials such as polyesters, yellowish-red hues are obtained which are fast to sublimation, dry heat treatment, heat setting or ironing. This compound having a cyano group terminally attached to an ethoxyethoxy group on an anthraquinone shows exceptional fastness to sublimation. This is surprising since a cyano group attached directly to the anthraquinone nucleus does not improve the sublimation fastness thereof, but only changes its hue slightly.

The compound of the invention may be prepared by various methods. One such method comprises the reaction of a 1-amino-2-halogeno-4-hydroxyanthraquinone with ethylene glycol. This reaction is conducted in an alkaline medium such as aqueous sodium hydroxide or potassium hydroxide. The resulting hydroxyalkoxy derivative may be cyanoalkylated directly with acrylonitrile. Other starting materials besides a 2-halogenoanthraquinone may be reacted with ethylene glycol and then cyanoalkylated to form the dyestuff of this invention. These include an anthraquinone having a sulfo or a phenoxy group in place of the halogen group in the foregoing anthraquinone. Alternatively, the analogous 2-hydroxyethoxy dye known in the art may be used directly to prepare the new sublimation fast dye of this invention by direct cyanoalkylation with acrylonitrile in the presence of a basic catalyst at elevated temperature.

The cyanoalkoxylated dye of this invention is unique in its fastness to sublimation among the disperse anthraquinone dyes. It has good solubility in organic solvents. Also, in general, it has a slightly yellower and much brighter hue than the corresponding red uncyanoalkoxylated dyes. Its color value is superior. In most instances dyeing properties are improved. It has excellent affinity and fastness on polyesters, nylon, cellulose acetate and polyacrylonitrile.

The following examples are presented to illustrate this invention more fully.

EXAMPLE 1

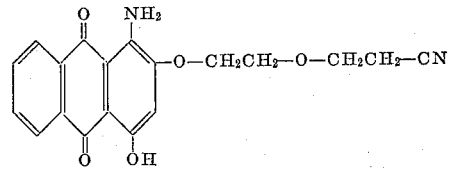

Step 1.—Condensation

To 400 parts by volume of ethylene glycol at 50° C. is added 12 parts of potassium hydroxide. To this solution is added 20 parts of 1-amino-2-bromo-4-hydroxyanthraquinone. The mixture is heated to 110° C. in one hour and held at 110–115° C. for 3 hours. The color changes from blue to red. The mixture is cooled to room temperature and 200 parts of water added. It is made slightly acid to methyl red yellow indicator paper with about 28 parts by volume of 20% hydrochloric acid. The product is collected, washed with water until free from acid and dried at 60–80° C. It is purified by dissolving in a minimum amount of dimethylformamide at 70° C. and reprecipitating with methanol. The 1-amino-2-(2-hydroxyethoxy)-4-hydroxyanthraquinone is collected, washed with methanol and dried.

Step 2.—Cyanoethylation

Ten parts of the product prepared in Step 1 is added to 3000 parts by volume of boiling t-butyl alcohol. To this is added 2.6 parts of potassium hydroxide dissolved in 200 parts by volume of t-butyl alcohol. 250 parts by volume of acrylonitrile is added and the mixture boiled for one and one half hours. An equal quantity of acrylonitrile is again added and the mixture boiled for forty-five minutes. The reaction mixture is then clarified by filtration. To the filtrate containing the product is added 5000 parts of water and sufficient 10% hydrochloric acid solution to give a positive test on Congo red indicator paper, about 26 parts by volume. The 1-amino-2-[2-cyanoethoxy)ethoxy]-4-hydroxyanthraquinone precipitates. It is collected, washed with water until acid-free and dried. Recrystallized from alcohol it melts at 159–160° C.

EXAMPLE 2

25 mg. of the dyestuff is dissolved in 2 ml. of acetone. This solution is added to a mixture of 50 ml. water and 1 ml. of a 5% solution of lauryl sodium sulfate. The whole is made up to 200 ml. with water.

A five gram skein made of a polyester derived from terephthalic acid and ethylene glycol is introduced and the bath heated to 150° F. To it is added 3 ml. of a 48% methyl salicylate emulsion, used as a carrier. The whole is heated to 205° F. over 20–30 minutes and then dyed at 205° F. for one hour. The dyed polyester is removed and rinsed in hot water. It is soaped for ten minutes at the boil in a 0.1% solution of neutral soap. The dyed skein or fabric is then rinsed with water and dried. The dyeing is a bright, strong yellowish red shade which is fast to sublimation and heat setting and of excellent fastness to light.

EXAMPLE 3

A skein of polyester, dyed by the method of Example 2, is placed on a strip of 80 square cotton. Along the top of the skein is placed a strip of polyester fabric. The whole is positioned in a test apparatus designed to simultaneously heat different sections of the strip sandwich at various temperatures, under pressure. The apparatus is called a "Thermotest® Rhodiaceta."

A block containing a series of heated studs at the respective temperatures listed below, is pressed onto the fabric sandwich at a pressure of 70 g. per sq. cm., for 30 seconds. The whole is then removed. The top strip of polyester is examined for sublimation and rated at each temperature point on a scale of 1 to 5.

5 means negligible or no sublimation,
4 means slight sublimation,
3 means noticeable sublimation,
2 means considerable sublimation,
1 means heavy sublimation.

A comparison of the compound of Example 1 with analogous compounds in which the cyano group is replaced with a hydroxy group and a chloro group, respectively, identically dyed by the method of Example 2 and tested as above, is given in the following table:

| Compound | Group | Sublimation rating at various temperatures | | | | |
|---|---|---|---|---|---|---|
| | | 431.6° F. | 422.6° F. | 406.4° F. | 384.8° F. | 368.6° F. |
| Example 1 | CN | 4–5 | 5⁻ | 5⁻ | 5 | 5 |
| Analogue | OH | 1–2 | 2–3 | 3 | 3–4 | 4 |
| Analogue | Cl | 1 | 1–2 | 2 | 3 | 3–4 |

EXAMPLE 4

When polyester yarn is dyed with the product of Example 1 (A) using the method of Example 2 and compared at 365° F. for fastness to sublimation with yarns dyed with the corresponding dyes, 1-amino-2-benzyloxy-4-hydroxyanthraquinone (B) and 1-amino-4-hydroxy-2-methoxyanthraquinone (C), the following results are obtained.

| | Hue on Polyester | Sublimation Fastness | Change on Heat Setting |
|---|---|---|---|
| A | Bright yellowish red | 5 | None. |
| B | Bluish red | 1–2 | Bluer, duller and weaker shade. |
| C | do | 1–2 | Do. |

EXAMPLE 5

To 100 ml. of stock dye dispersion prepared as in Example 2 is added 100 ml. of water. Five-gram skeins are entered in the dye bath and the temperature raised to 200° F. in 20 to 30 minutes. Dyeing is carried out for one hour at 200° F. The skeins are then rinsed with water and dried.

By this method skeins of acetate, triacetate, nylon and polyacrylonitrile fibers are dyed.

On acetate and triacetate, colors of strong color value, fast to sublimation and of good fastness to light are obtained. The dye has strikingly better affinity for nylon than the corresponding 2-benzyloxy dye dyed by this method. On polyacrylonitrile, a pink hue of good fastness to light and sublimation is obtained.

I claim:

The compound 1-amino-2-[2-(2 - cyanoethoxy)ethoxy]-4-hydroxyanthraquinone.

References Cited by the Examiner
UNITED STATES PATENTS 2,242,760 5/1941 Schoeller et al. ____ 260—380 X
2,359,381 10/1944 Perkins et al. _____ 260—380 X
2,844,598 7/1958 Günthard _____ 260—380
2,992,240 7/1961 Lodge _____ 260—380

LORRAINE A. WEINBERGER, *Primary Examiner.*

R. K. JACKSON, *Examiner.*

H. C. WEGNER, *Assistant Examiner.*